No. 814,155. PATENTED MAR. 6, 1906.
W. F. M. McCARTY.
APPARATUS FOR DECOMPOSING WATER BY ELECTROLYSIS.
APPLICATION FILED NOV. 8, 1904. RENEWED AUG. 14, 1905.
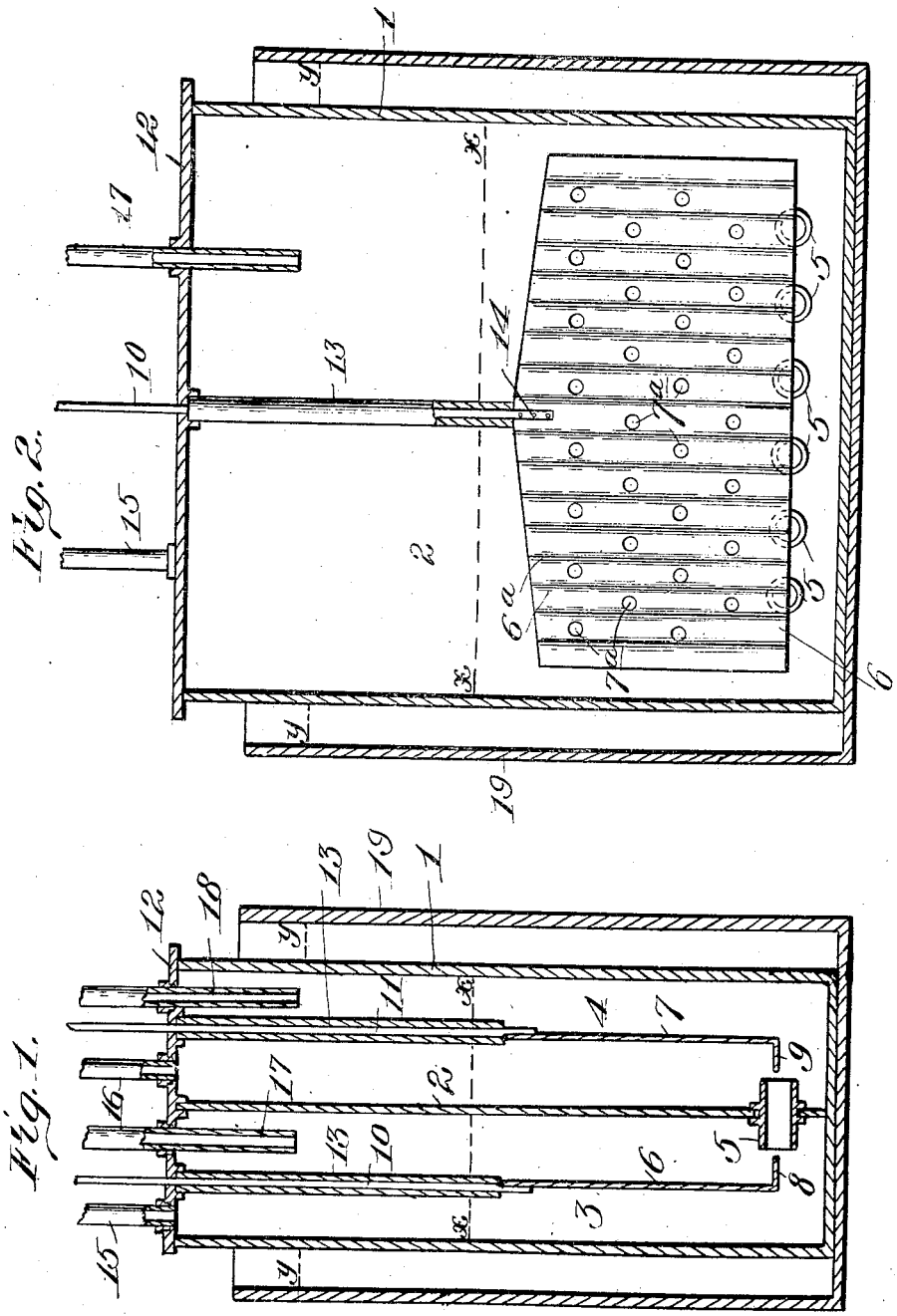

UNITED STATES PATENT OFFICE.

WILLIAM F. M. McCARTY, OF ROCKY RIDGE, MARYLAND, ASSIGNOR TO THOMAS A. DARBY, TRUSTEE, OF NEW YORK, N. Y.

APPARATUS FOR DECOMPOSING WATER BY ELECTROLYSIS.

No. 814,155.   Specification of Letters Patent.   Patented March 6, 1906.

Application filed November 8, 1904. Renewed August 14, 1905. Serial No. 274,240.

*To all whom it may concern:*

Be it known that I, WILLIAM F. M. MC-CARTY, a citizen of the United States, residing at Rocky Ridge, in the county of Frederick and State of Maryland, have invented new and useful Improvements in Apparatus for Decomposing Water by Electrolysis, of which the following is a specification.

This invention relates to certain new and useful improvements in an apparatus for decomposing water by electrolysis, and has for its object to provide a device in which the construction and arrangement of the parts will enable the decomposition of the water to be accomplished with the minimum amount of current at a low potential and will insure the separation and collection of gases as evolved.

In order that the invention may be clearly understood, I have illustrated the same in the accompanying drawings, in which—

Figure 1 is a vertical sectional elevation of the apparatus, and Fig. 2 is a similar view taken at right angles to Fig. 1.

Referring now to the drawings, 1 indicates the tank, preferably oblong in shape and formed of any suitable material, within which is mounted a glass partition 2, extending from top to bottom of the tank and extending centrally of the tank and parallel with its longest sides, thereby dividing the tank into two similar chambers 3 4. Near its bottom end the partition 2 is provided with a series of apertures extending in a horizontal direction from side to side of the partition, and in each of these apertures is located a short glass-tube 5, which projects an equal distance into the respective chambers 3 4. Six of these tubes are shown in the drawings, although a greater or less number may be employed.

6 7 indicate two electrodes suspended in the respective chambers 3 4 and each of which is bent at right angles at its lower end, as indicated at 8 9, to form discharging terminals of the electrodes, the outer ends of said projecting portions being located in close proximity to the respective ends of the tubes 5. The electrodes 6 and 7 may be composed of any suitable material; but preferably I employ platinum. They are preferably corrugated, as indicated at $6^a$, and perforated, as indicated at $7^a$.

The numerals 10 11 indicate two conductors, which are connected with a suitable source of current-supply, these conductors being led through the top 12 of the tank, and each conductor is incased in a glass tube 13 to extend from the top of the tank to the top of the respective electrodes. The conductors 10 11 are connected at their lower ends to the respective electrodes, one of such connections being indicated in Fig. 2 at 14. Leading through the top 12 and communicating, respectively, with the two chambers 3 4 are two tubes 15 16 for leading off the oxygen and hydrogen gases as evolved, and two tubes 17 18 for supplying chemicals and water to the tank 1.

19 indicates a suitable vessel for containing water, and in operation the tank 1 is immersed in water to about the depth indicated by the line $x\,x$, in order that the apparatus may be kept cool, as a large amount of heat is generated in the decomposition of water according to my process.

In operation water is supplied to the tank 1 to about the depth indicated by the line $y\,y$. I then supply to the water from the tubes 17 and 18 a suitable amount of metallic alkali, preferably metallic sodium. If desired, the water may be acidulated by adding a small quantity of sulfuric acid thereto. At the time the metallic sodium is added to the water ebullition of the latter occurs, and at this moment the circuit is closed through the conductors 10 and 11 and electrical discharges occur from the terminal portions 8 and 9 through the tubes 5. When the electrical discharge occurs, the current passing through the water in the tubes 5 decomposes the water, the oxygen being drawn toward the anode 7 and rising through the water to pass out by the tube 16 and the hydrogen being attracted to the cathode 6 and rising through the water to pass out by the tube 15. The diaphragm 2, of course, prevents commingling of the gases and insures their separation at the moment of liberation. The electrodes 6 and 7, which approximately extend from side to side of the tank, present a large area to the surface of the water, and their discharging-points 8 9 being brought relatively close together the passage of the current through the water is effected without any considerable amount of resistance being offered thereto. The tubes 5 insure a series of separate discharges along the edges of the discharge-terminals 8 9, and this results in the rapid decomposition of water. The corrugations serve to strengthen the electrodes and to prevent them from doubling up and losing their shape under the influence of the heat generated, and the perforations permit the bubbles of gas to pass through the electrodes to the water without having to pass over the entire surface of said electrodes.

Having thus fully described my invention, what I claim as new, and desire to secure by Letters Patent, is—

1. In an apparatus of the class described, in combination with a tank, a partition mounted therein and dividing the tank into two chambers, said partition being provided with a line of apertures, and an electrode mounted in each compartment and connected with a suitable source of current-supply and having a terminal discharge portion extending at right angles to the body of the electrode located opposite and in line with all of the apertures in said partition.

2. In an apparatus of the class described, in combination with a tank, a partition extending from top to bottom thereof and dividing the tank into two chambers, said partition being provided near its lower end with a line of apertures, and an electrode suspended in each chamber and connected with a suitable source of current-supply and having a terminal discharge portion extending at right angles to the body of the electrode located opposite and in line with all of the apertures in said partition.

3. In an apparatus of the class described, in combination with a tank, a partition extending from top to bottom thereof and dividing the tank into two chambers, said partition being provided near its lower end with a series of apertures, a glass tube mounted in each aperture and extending into the respective chambers, and an electrode mounted in each chamber and connected with a suitable source of current-supply and having a terminal discharge portion located directly opposite and in close proximity to the ends of said tubes.

4. In an apparatus of the class described, in combination with a tank, a partition extending from top to bottom thereof and dividing the tank into two chambers, said partition being provided near its lower end with a series of apertures, a tube mounted in each aperture and projecting into the respective chambers, and an electrode suspended in each chamber and connected with a suitable source of current-supply, each electrode comprising a plate of suitable material extending approximately from side to side of the tank to present a large superficial area and having its lower end portion bent inward at right angles and located in close proximity to and directly opposite the ends of the tubes.

In testimony whereof I have hereunto set my hand in presence of two subscribing witnesses.

WILLIAM F. M. McCARTY.

Witnesses:
  BRUCE S. ELLIOTT,
  GEO. W. REA.